US008021031B2

(12) United States Patent
Kaoud et al.

(10) Patent No.: US 8,021,031 B2
(45) Date of Patent: Sep. 20, 2011

(54) AUTOMOTIVE HEAD LAMP BULB SHIELD

(75) Inventors: Ehab Kaoud, Canton, MI (US); Lon Zaback, Farmington Hills, MI (US); David Griffiths, Ann Arbor, MI (US); Bruce P. Williams, Grosse Pointe Park, MI (US); Albert Ekladyous, Shelby Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1237 days.

(21) Appl. No.: 11/670,090

(22) Filed: Feb. 1, 2007

(65) Prior Publication Data

US 2008/0186727 A1 Aug. 7, 2008

(51) Int. Cl.
*B60Q 1/04* (2006.01)

(52) U.S. Cl. ........ 362/516; 362/255; 362/256; 362/538; 362/539; 362/354

(58) Field of Classification Search .................. 362/539, 362/255, 256, 351, 354, 538, 516, 517
See application file for complete search history.

(56) References Cited

U.S. PATENT DOCUMENTS

| | | | |
|---|---|---|---|
| 1,493,426 | A | 5/1924 | Bowman |
| 1,500,075 | A | 7/1924 | Hipp et al. |
| 1,514,242 | A | 11/1924 | Young |
| 2,202,278 | A | 5/1940 | White |
| 2,341,822 | A | 2/1944 | Seal |
| 3,275,820 | A | 9/1966 | Szarkowski |
| 3,573,705 | A | 4/1971 | Magi |
| 4,305,015 | A | 12/1981 | Honda et al. |
| 4,383,290 | A | 5/1983 | Binder et al. |
| 4,525,772 | A | 6/1985 | Peck |
| 4,555,748 | A | 11/1985 | Bradley |
| 4,558,401 | A | 12/1985 | Tysoe |
| 4,575,787 | A | 3/1986 | Birt |
| 4,747,029 | A | 5/1988 | Liverance et al. |

(Continued)

FOREIGN PATENT DOCUMENTS

EP 0106616 B1 5/1989

(Continued)

OTHER PUBLICATIONS

Notice of Allowance for U.S. Appl. No. 11/670,106, mailed Jan. 12, 2009, 4 pages.

(Continued)

*Primary Examiner* — Stephen F Husar
*Assistant Examiner* — James Cranson, Jr.
(74) *Attorney, Agent, or Firm* — Damian Porcari Brooks Kushman P.C.

(57) ABSTRACT

A head lamp for a motor vehicle is disclosed with a reflector for reflecting light. A light bulb is oriented within the head lamp and spaced apart from the reflector for providing illumination that is reflected from the reflector and out of the head lamp. A bulb shield is provided with a peripheral region displaced about the light bulb for preventing glare light from exiting the head lamp. In one embodiment, the peripheral region is a polygon that is not radially symmetrical. In another embodiment, the bulb shield has a rear opening and a front opening for minimizing heat within the bulb shield. In yet another embodiment, the bulb shield has a front opening and the light bulb front portion is coated with an opaque material for blocking glare light.

20 Claims, 3 Drawing Sheets

U.S. PATENT DOCUMENTS

| | | | | | |
|---|---|---|---|---|---|
| 4,754,373 | A * | 6/1988 | Otto et al. | | 362/547 |
| 4,807,094 | A | 2/1989 | Mateos et al. | | |
| 4,882,660 | A | 11/1989 | Liverance et al. | | |
| 4,926,301 | A | 5/1990 | Liverance et al. | | |
| 4,987,343 | A * | 1/1991 | Kosmatka et al. | | 315/82 |
| 5,010,458 | A | 4/1991 | Fraizer | | |
| 5,055,983 | A | 10/1991 | Hunold et al. | | |
| 5,136,482 | A | 8/1992 | Urbschat | | |
| 5,149,191 | A * | 9/1992 | Lewin et al. | | 362/290 |
| 5,681,104 | A | 10/1997 | Chinniah et al. | | |
| 5,993,035 | A * | 11/1999 | May et al. | | 362/547 |
| 6,059,433 | A | 5/2000 | Otaka et al. | | |
| 6,072,277 | A | 6/2000 | Yamamoto et al. | | |
| 6,129,448 | A | 10/2000 | Takasaki et al. | | |
| 6,375,341 | B1 | 4/2002 | Denley | | |
| 6,422,729 | B1 | 7/2002 | Rohrbach et al. | | |
| 6,450,670 | B1 | 9/2002 | Strauss et al. | | |
| 6,495,222 | B1 | 12/2002 | Mosser et al. | | |
| 6,601,981 | B2 | 8/2003 | Wilski | | |
| 6,663,264 | B2 * | 12/2003 | Gelfand et al. | | 362/373 |
| 6,685,347 | B2 | 2/2004 | Grutze | | |
| 6,786,624 | B2 | 9/2004 | Poorman | | |
| 6,821,003 | B2 | 11/2004 | Baker et al. | | |
| 7,008,098 | B2 | 3/2006 | Yamaguchi et al. | | |
| 7,527,395 | B2 * | 5/2009 | Zaback et al. | | 362/290 |
| 2003/0156424 | A1 | 8/2003 | Grutze | | |
| 2003/0227782 | A1 | 12/2003 | Poorman | | |
| 2004/0012973 | A1 | 1/2004 | Baker et al. | | |
| 2004/0145898 | A1 | 7/2004 | Ase et al. | | |
| 2005/0036333 | A1 * | 2/2005 | Van Duyn | | 362/539 |
| 2006/0034093 | A1 | 2/2006 | Strazzanti | | |
| 2008/0186728 | A1 * | 8/2008 | Zaback et al. | | 362/517 |

FOREIGN PATENT DOCUMENTS

| | | | |
|---|---|---|---|
| EP | 0347065 | B1 | 4/1994 |
| EP | 1128126 | A2 | 8/2001 |
| EP | 1426678 | A2 | 6/2004 |
| GB | 2022234 | A | 12/1979 |
| JP | H11238402 | A | 8/1999 |
| WO | 03027990 | A2 | 4/2003 |
| WO | 2006023541 | A2 | 3/2006 |

OTHER PUBLICATIONS

Office Action for U.S. Appl. No. 11/670,106, mailed Jun. 5, 2008, 9 pages.

Office Action for Chinese Application No. 200810004768.0, Dated Jun. 23, 2010, 3 Pages.

Translation only of Chinese Office Action for Application No. 200810004766.1, mailed May 23, 2011, 3 pages.

Translation only of Chinese Office Action for Application No. 200810004768.0, mailed Mar. 17, 2011, 3 pages.

* cited by examiner

AUTOMOTIVE HEAD LAMP BULB SHIELD

BACKGROUND OF THE INVENTION

1. Field of the Invention

The present invention relates to automotive head lamps.

2. Background Art

Automotive head lamps have often employed a light bulb, a reflector, and a lens. The light bulb is typically oriented between the reflector and the lens to emit light omnidirectionally from the bulb. The light radiates from the bulb and out of the lens. The light also radiates from the bulb and reflects from the reflector out of the lens. By employing parabolic reflectors, the light from the light bulb may reflect from the reflector in a focused pattern such that the omnidirectional light is focused to radiate from the lens in a uniform manner. Thus, the light is targeted upon the desired region.

In order to prevent the omnidirectional light from the bulb from interfering with the vision of oncoming travelers, the prior art has employed louvres within head lamps. Such louvres include an array of parallel slats provided directly between the bulb and the lens such that light from the forward portion of the bulb is only permitted to exit the lens in a direction consistent with the focused light pattern from the reflector and louvres.

As automotive head lamps have continued to evolve, louvres have been subsequently replaced by bulb shields. Bulb shields are typically oriented in front of the light bulb so that light from a forward region of the light bulb is prevented from exiting the lens. Thus, the only light exiting a head lamp with a bulb shield is light from the light bulb that reflects off the parabolic reflector and therefore is focused to illuminate the required region. The bulb shield provides an alternative solution to the louvres, which is less complicated and provides desired illumination characteristics.

Louvres and bulb shields are typically associated with low beam or daytime head lamps wherein the vision of oncoming traffic is a concern. High beams are typically employed without a louvre or a bulb shield permitting omnidirectional and focused light to exit the lens. Adjustable louvres have been utilized also for adjusting the direction of illumination in head lamps that were employed by both a low beam and a high beam.

As head lamp technology has evolved, head lamp lenses have gone from glass to a transparent polymer, which provides adequate structural characteristics, adequate visual and illumination characteristics, and improvements in manufacturing and design capabilities.

SUMMARY OF THE INVENTION

An embodiment of the present invention provides a head lamp for a motor vehicle with a reflector for reflecting light and a light bulb oriented within the head lamp spaced apart from the reflector for providing illumination that is reflected from the reflector and out of the head lamp. A bulb shield with a peripheral region displaced about the light bulb prevents glare from exiting the head lamp. The peripheral region in one embodiment is a polygon that is not radially symmetrical.

Another embodiment of the present invention provides a head lamp for a motor vehicle with a reflector for reflecting light and a light bulb oriented within the head lamp that is spaced apart from the reflector for providing illumination that is reflected from the reflector and out of the head lamp. A bulb shield is provided with a peripheral region displaced about the light bulb for preventing glare light from exiting the head lamp. The bulb shield has a rear opening and a front opening for minimizing heat within the bulb shield.

Yet another embodiment of the present invention provides a head lamp for a motor vehicle with a housing adapted to be affixed to a motor vehicle. A reflector is mounted to the housing for reflecting light. A generally transparent lens is mounted to the reflector for enclosing the head lamp. A light bulb is oriented within the head lamp spaced apart from the reflector for providing illumination that is reflected from the reflector and out of the head lamp. A forward portion of the light bulb is coated with an opaque material for preventing glare light from exiting the head lamp. A bulb shield is provided with a polygonal peripheral region that is not radially symmetrical and is displaced about the light bulb for preventing glare light from exiting the head lamp. The bulb shield has a rear opening and a front opening for minimizing heat within the bulb shield.

The above embodiments and other embodiments, aspects, objects, benefits and advantages of the present invention are apparent in the attached figures and in the detailed description of embodiments of the invention below.

DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
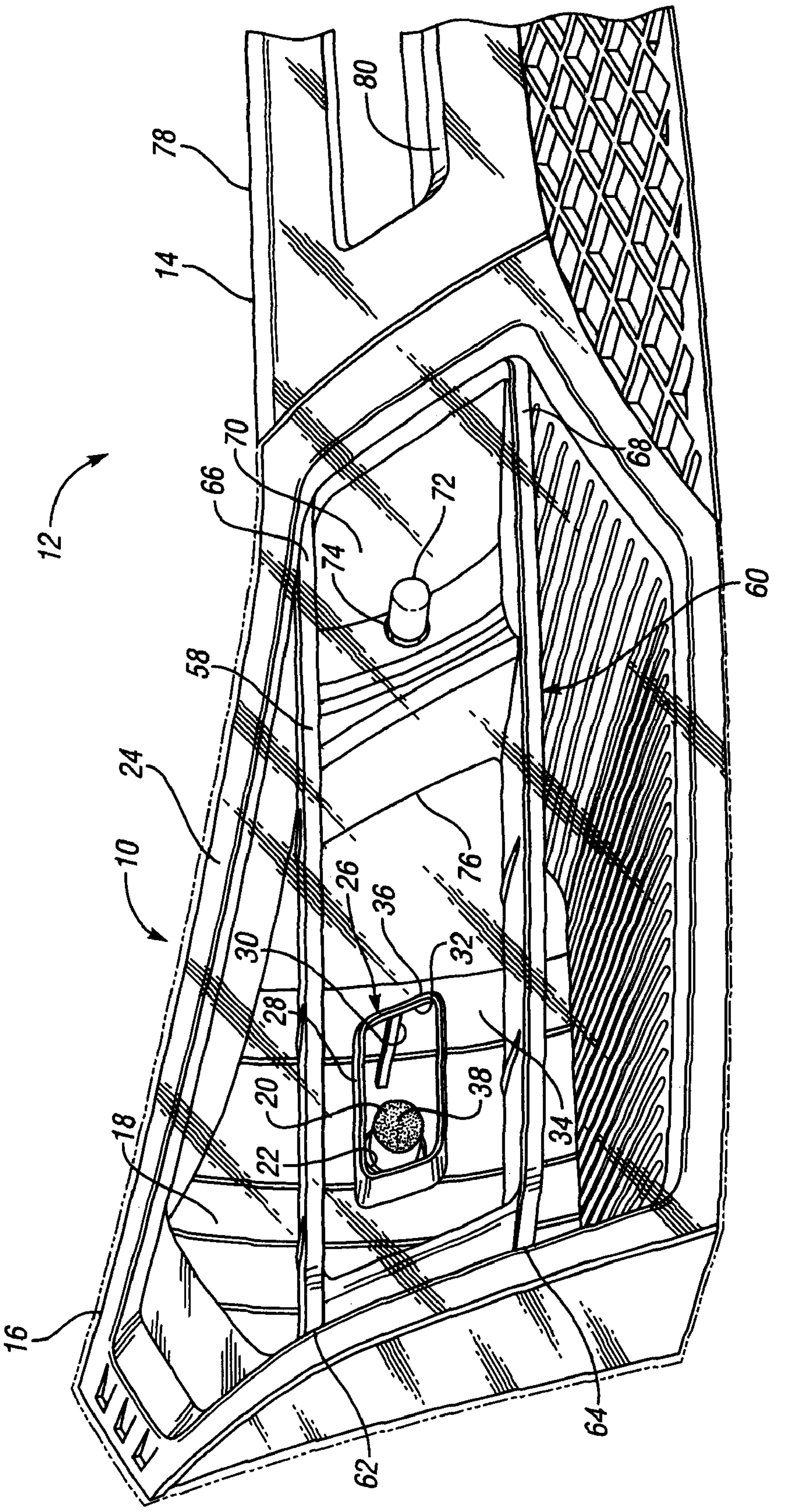
FIG. 1 is a perspective view of a head lamp and a portion of a motor vehicle in accordance with the present invention.
Figure 2:
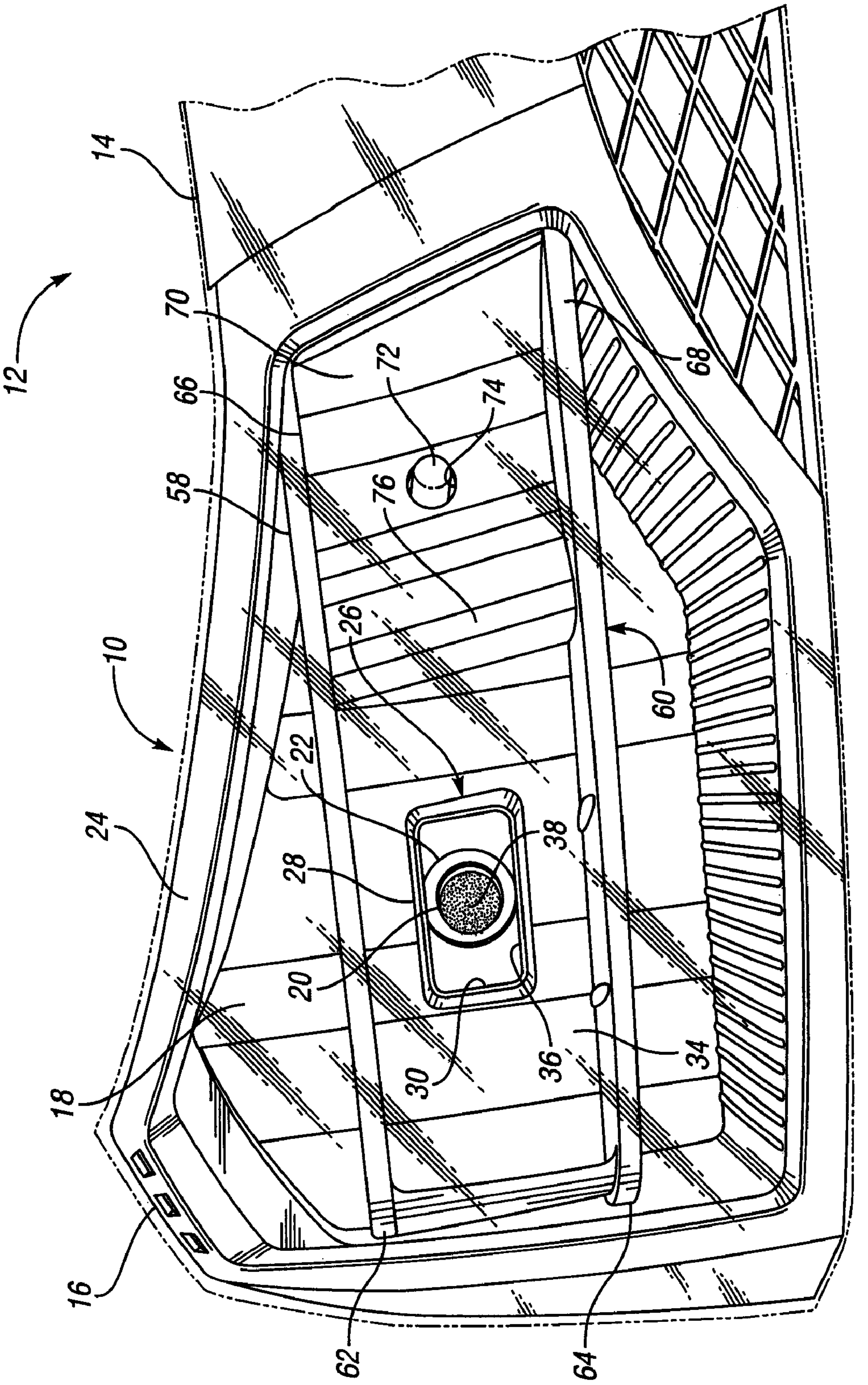
FIG. 2 is a front elevation view of the head lamp embodiment and motor vehicle portion of FIG. 1.

With reference now to FIGS. 1 and 2, a head lamp is illustrated in accordance with the present invention and is referenced generally by numeral 10. The head lamp 10 is illustrated in cooperation with a portion of a motor vehicle 12, which is depicted partially by the head lamp 10 and a portion of a vehicle grille 14. Although one head lamp 10 is illustrated, the invention contemplates any number of head lamps, such as a pair of head lamps 10. Each of the pair of head lamps is displaced on a front end of the vehicle 12 at transversely spaced apart sides, such as the head lamp 10 for a left front side of the vehicle 12 and another head lamp that is a mirror image of the head lamp 10 on the right front side of the vehicle 12. Thus, the head lamp 10 depicted in FIGS. 1 and 2 is on the front left side of the vehicle 12 when viewed from the front of the vehicle 12, which is often referred to as the passenger side of the vehicle 12 for vehicles in the United States.

The head lamp 10 has a housing 16 for securing the head lamp 10 to the vehicle 12. The head lamp 10 also includes a reflector 18 for reflecting light from the head lamp 10. The reflector 18 has a reflective surface for reflecting the light out of the head lamp 10. Additionally, the reflector 18 has a generally parabolic shape for redirecting the light in a focused array. The parabolic surface of the reflector 18 may be formed from a continuous parabolic surface, or by multiple facets, as illustrated in the reflector 18 of FIGS. 1 and 2, that collectively provide a parabolic surface of the reflector 18.

The head lamp 10 also includes a light source, such as a light bulb 20, for illuminating the head lamp 10. The light bulb 20 may be any light source, such as a halogen bulb for example, for adequately illuminating the head lamp 10. The light bulb 20 is mounted to the housing 16 and is spaced apart from the reflector 18 for providing illumination that is reflected from the reflector 18 and out of the head lamp 10.

The light bulb 20 generally radiates light omnidirectionally. Accordingly, the light bulb 20 is provided at a focal point of the parabolic reflector 18 such that omnidirectional light from the light bulb 20 is reflected from the reflector 18 and is focused into a forward path of illumination.

The housing 16 of the head lamp 10 may be provided with an aperture 22 for rearward access to the light bulb 20 for replacement of the light bulb 20.

The head lamp 10 also includes a lens 24 for enclosing the housing 16 and protecting the light bulb 20. The lens 24 is generally transparent and may be formed from a polymer that is molded to the head lamp 10.

The head lamp 10 is also provided with a bulb shield 26 for preventing glare light from exiting the head lamp 10. The bulb shield 26 has a peripheral region 28 that is displaced about the light bulb 20 and is mounted to the housing 16 by a pair of brackets 30.

Light bulbs, such as the light bulb 20, generally emit light rays omnidirectionally and uniformly from the light bulb 20. Accordingly, prior art bulb shields have commonly been designed as radially symmetrical about the light bulb 20 for blocking the glare light. By blocking the glare light, the prior art bulb shields absorb a large amount of heat, which commonly results in fatigue and eventual failure. The radial symmetry of the peripheral region of prior art bulb shields results in a uniform distribution of blocked glare light and therefore a uniform distribution of heat to the prior art bulb shields.

Figure 3:
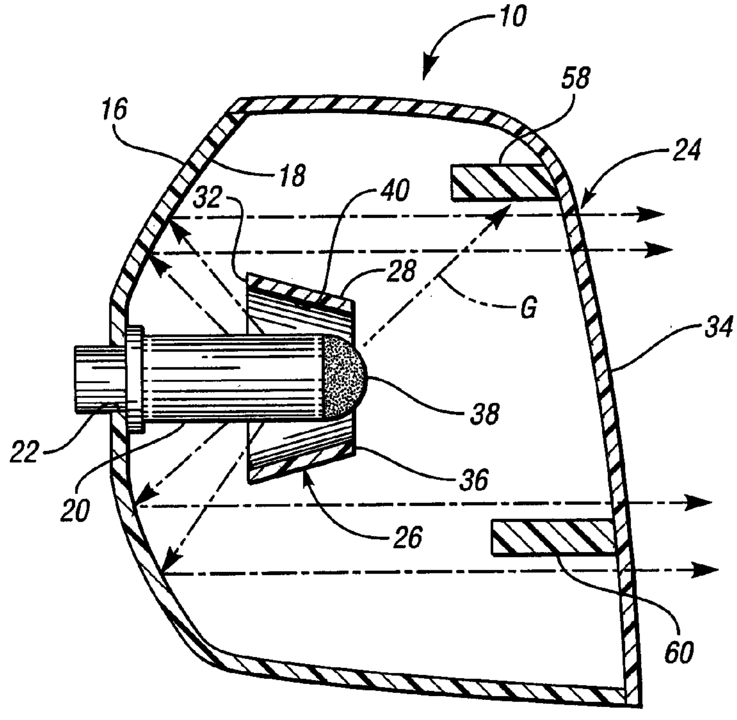
FIG. 3 is a section view of the head lamp of FIG. 1.

The bulb shield 26 of the head lamp 10 of the depicted embodiment has a peripheral region 28 that is not radially symmetrical. Therefore, the bulb shield 26 blocks glare light and consequently absorbs heat unevenly to therefore facilitate the dissipation of absorbed heat from the bulb shield 26 to the ambient air. For example, the peripheral region 28 of the bulb shield 26 is illustrated as a polygon, such as a parallelogram for extending away from the light bulb 20, such as transversely away, for extending the peripheral region 28 away from the light bulb 20 for enhanced dissipation of heat into the ambient air. The peripheral region 28 may have rounded corners for a smooth transition between the quadrilateral sides of the peripheral region 28. Referring to FIG. 3, the peripheral region 28 diverges toward the reflector 18 to be angled to block the glare light.

As illustrated in FIGS. 1 to 3, the bulb shield 26 has a rear opening 32 for permitting omnidirectional light rays, as illustrated in FIG. 3, to radiate from the light bulb 20 and reflect off the reflector 18 out of an exit region 34 of the lens 24. The bulb shield 26 may also be provided with a forward opening 36 for minimizing heat collected within the bulb shield 26. Unlike prior art bulb shields, the bulb shield 26 with the forward and rearward openings 36, 32 permits ambient air to pass through the bulb shield 26 thereby dissipating heat collected by the bulb shield 26.

To prevent glare light from exiting the bulb shield to the forward opening 36, a forward portion 38 of the light bulb 20 is coated with an opaque material in one embodiment for preventing glare light from exiting the forward portion 38 of the light bulb 20 and therefore preventing glare light from exiting the forward opening 36 of the bulb shield 26. The opaque material may be any suitable material that is utilized for preventing the reflection of light, such as coatings that are known in the prior art for coating an internal region of prior art bulb shields. Likewise, an inner surface 40 of the peripheral region 28 of the bulb shield 26 may be coated with an opaque or non-reflective material for preventing light from the light bulb 20 from reflecting off the inside of the bulb shield 26.

Referring again to FIG. 2, the bulb shield 26 may be shaped as a polygon that is similar in profile to the exit region 34 for only blocking the glare light that would exit the exit region 34.

Figure 4:
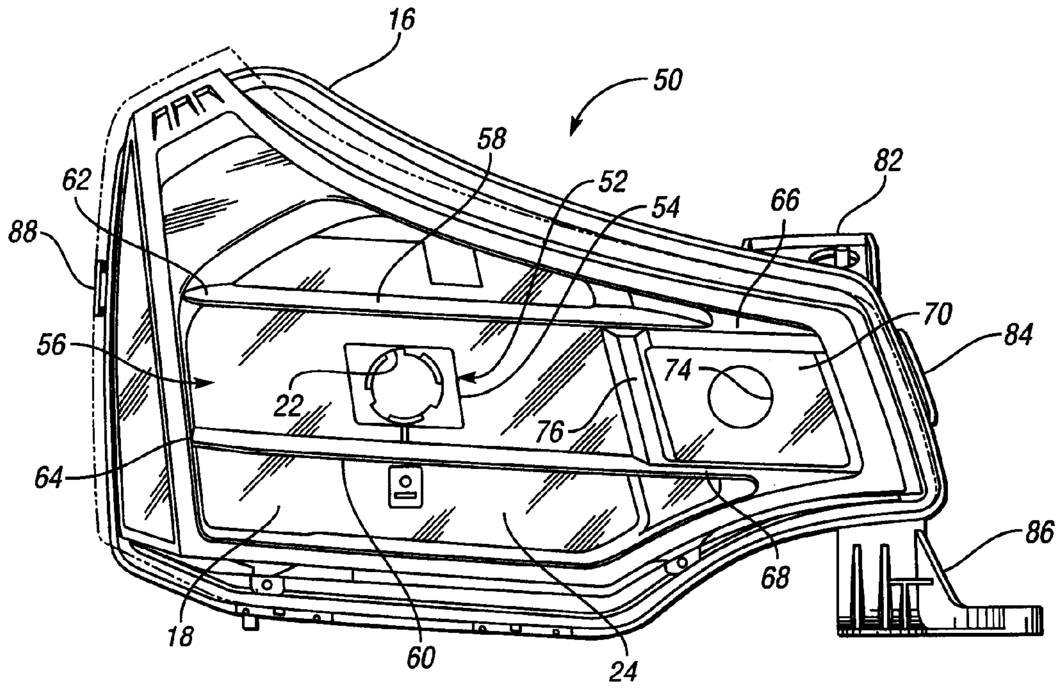
FIG. 4 is a front end elevation view of another head lamp embodiment in accordance with the present invention.

Of course, various head lamp and bulb shield configurations are contemplated within the spirit and scope of the present invention. With reference now to FIG. 4, another head lamp 50 is illustrated within the spirit and scope of the present invention. The head lamp 50 is similar to the head lamp 10 of the prior embodiment; however the head lamp 50 includes a bulb shield 52 with a peripheral region 54 with a rhomboid profile. Likewise, an exit region 56 of the lens 24 of the head lamp 50 may have a generally rhomboid profile. The exit region 56 profile may dictate the geometrical profile of the bulb shield 52. Alternatively, the bulb shield 52 may have a geometrical profile that does not match, or is not geometrically similar to the exit region 56.

Referring again to the head lamp 10 of FIGS. 1 to 3, the head lamp 10 also includes a louvre 58, or, as depicted, a pair of louvres 58, 60. Unlike prior art louvres, which were utilized for directing glare light prior to the development of bulb shields, the louvres 58, 60 do not extend directly between the light bulb and the lens 24. In one embodiment, the louvres 58, 60 extend about the exit region 34 as a bezel for defining the exit region 34 as a region that is smaller than the lens 24 of the head lamp 10. Unlike the prior art, the bezel provided by the louvres 58, 60 is spaced apart from the reflector 18 rather than mounted to a perimeter of the reflector 18. In another embodiment, the louvres 58, 60 may be utilized for preventing glare light G from exiting the exit region as illustrated by the phantom ray in FIG. 3. However, due to the combined glare shield 26 and the opaque forward portion 38 of the light bulb 20, the louvres 58, 60 are not required to block all glare light and therefore the louvres 58, 60 are not required to extend directly between the light bulb 20 and the lens 24 in the present embodiment.

Alternatively, the exit region 34 may be larger than the region bounded by the louvres 58, 60 and therefore the louvres 58, 60 may extend directly through the exit region 34. Accordingly, internal surfaces of the louvres 58, 60 may be painted flat black or another opaque or non-reflective color to prevent incident reflection of light off of the louvres 58, 60 to result in glare light.

Another feature of the louvres 58, 60 is structural enhancement of the head lamp 10. In the advent of further contouring of head lamps 10, various shapes, sizes and geometries of head lamps 10 are being employed which further evolve from the conventional rectangular head lamp with a glass lens. By fabricating head lamps, such as the head lamp 10, from polymeric materials and by providing the lens 24 from a polymeric material that is displaced along a large surface area of the head lamp 10, an intermediate region, or exit region 34, of the lens 24 may be structurally enhanced by the louvres 58, 60 displaced directly behind the lens 24. Thus, each louvre 58, 60 has an outboard end 62, 64 mounted to an outboard side of the housing 16, and an inboard end 66, 68 mounted to an inboard side of the housing 16. The louvres 58, 60 may be formed integrally with the housing 16 by an injection molding process, or by incremental molding processes such as insert molding. By displacing the louvres 58, 60 directly behind the lens 24, the lens 24 is less susceptible to failure due to an impact, such as a rock, debris, or any similar projectile that may be confronted during travel.

The louvres 58, 60 may also be utilized for connecting the reflector 18 to a secondary reflector 70. The secondary reflector 70 may also be interconnected with the housing 16 and the louvres 58, 60 for integration of the primary and secondary reflectors 18, 70 into a common head lamp 10. The louvres 58, 60 may also provide a bezel to define the exit region 34 for the secondary reflector 70. A second light bulb 72 may be provided within the head lamp 10 for providing illumination that is reflected from the secondary reflector 70 and directed through the lens 24. Similar to the primary light bulb 20, a second aperture 74 may be provided through the housing 16 and the secondary reflector 70 for permitting access to the second light bulb 72 for assembly and replacement.

The invention contemplates utilization of a second bulb shield for the second light bulb 72 for blocking glare light. The invention also contemplates other glare light blocking apparatuses such as an opaque material upon a portion of the second light bulb 72, further louvres, or any suitable glare light blocking apparatus.

However, the second light bulb 72 of the depicted embodiment of head lamp 10 is provided without a glare light blocking mechanism so that the second light bulb 72 can be utilized for an ancillary lighting application, such as a colored lighting application for turn indication. The second light bulb 72 can also be utilized as a high beam, which is selectively illuminated for certain high beam lighting conditions. Thus, a turn indicator or high beam may be utilized with louvres, as in the present invention, without requiring a tilt adjustment for the louvres 58, 60 as in the prior art. Thus, the louvres 58, 60 are securely affixed, for example, to the housing 16 and the primary and secondary reflectors 18, 70 for enhanced structural rigidity of the head lamp 10.

A third louvre 76 may be provided as illustrated, for example, extending vertically between the horizontal louvres 58, 60 for separating the regions of illumination for the first and second light bulbs 20, 72. Additionally, the third louvre 76 may be utilized for interconnecting the housing 16 and the reflectors 18, 70 at the intersection of the reflectors 18, 70.

For the motor vehicle 12 of the embodiment illustrated in FIGS. 1 and 2, the grille 14 includes a pair of cross supports 78, 80 extending across the front of the vehicle 12. Likewise, the louvres 58, 60 may be aligned with the grille cross supports 78, 80 for continued structural enhancement of the front of the vehicle 12 across the grille 14 and the head lamp 10.

With reference now to FIG. 4, the head lamp 50 is illustrated disassembled from the vehicle 12. The head lamp 50 includes multiple brackets 82, 84, 86, 88 and perhaps others for securing the housing 16 to the vehicle 12. Specifically, the housing 16 includes brackets 82, 84, 86, 88 mounted adjacent to the distal ends of the louvres 58, 60 for integrating the louvres 58, 60 into the structure of the vehicle 12. Thus, impacts imparted to the lens 24 are thereby distributed directly to the louvres 58, 60 to the housing 16, and to the vehicle 12 through the brackets 82, 84, 86, 88.

Thus, structural features of the head lamps 10, 50 and lighting features of the head lamps 10, 50 may be optimized by utilization of the louvres 58, 60, 76 or louvres of various geometries and arrangements in accordance with the present invention. Additionally, various options for blocking glare light may be utilized separately or may be integrated into a common head lamp 10, 50 for preventing glare light from exiting the head lamp 10, 50. Additionally, various geometries of louvres and bulb shields may be utilized separately or collectively for optimizing glare light blocking and structural enhancement of the head lamp 10, 50.

Such geometries may be repeated or integrated into other design features of the vehicle 12 for common design cues from the head lamps to the vehicle. One such example is the alignment of the grille cross supports 78, 80 with the louvres 58, 60 for transverse structural support across the front of the vehicle 12 and for uniformity of the lateral lines. Additionally, the louvres 58, 60 may be painted a common exterior color with that of the grille 14 or other body components so that the head lamp appears the same color, at least partially, as the exterior of the vehicle 12.

While embodiments of the invention have been described in detail, those familiar with the art to which this invention relates will recognize various alternative designs and embodiments for practicing the invention as defined by the following claims.

What is claimed:

1. A head lamp for a motor vehicle comprising:

a reflector for reflecting light:

a light bulb oriented within the head lamp spaced apart from the reflector for providing illumination that is reflected from the reflector and out of the head lamp;

a bulb shield having a peripheral region displaced about the light bulb for preventing glare light from exiting the head lamp, wherein the peripheral region is a polygon that is not radially symmetrical; and a bracket mounted to the reflector for extending the bulb shield about the light bulb at an orientation that is spaced apart from the reflector.

2. The head lamp of claim 1 wherein the bulb shield peripheral region is further defined as a parallelogram.

3. The head lamp of claim 1 wherein the bulb shield peripheral region is further defined as a parallelogram with rounded corners.

4. The head lamp of claim 1 wherein the bulb shield peripheral region is further defined as a general parallelogram with sides that collectively diverge towards the reflector.

5. The head lamp of claim 1 wherein the bulb shield peripheral region is further defined as a quadrilateral.

6. The head lamp of claim 1 wherein the bulb shield peripheral region is further defined as a rhomboid.

7. The head lamp of claim 1 wherein a surface of the bulb shield that faces the light bulb is coated with a non-reflective material.

8. The head lamp of claim 1 wherein the bulb shield has a rear opening provided therein for permitting light to exit the bulb shield.

9. The head lamp of claim 1 further comprising a housing adapted to be affixed to a motor vehicle.

10. The head lamp of claim 1 wherein the reflector is generally parabolic.

11. The head lamp of claim 1 further comprising a louvre oriented within the head lamp.

12. The head lamp of claim 1 wherein the bulb shield has a forward opening provided therein for minimizing heat within the bulb shield.

13. The head lamp of claim 12 wherein a forward portion of the light bulb is coated with an opaque material for preventing glare light from exiting the head lamp.

14. The head lamp of claim 1 further comprising a generally transparent lens mounted to the reflector, the lens having an exit region for permitting light to exit the head lamp.

15. The head lamp of claim 14 wherein the bulb shield peripheral region is further defined as a polygon similar in profile to the exit region for preventing glare light from exiting the exit region.

16. A head lamp for a motor vehicle comprising:

a reflector for reflecting light;

a light bulb oriented within the head lamp spaced apart from the reflector for providing illumination that is reflected from the reflector and out of the head lamp; and a bulb shield having a peripheral region displaced about the light bulb for preventing glare light from exiting the head lamp, the bulb shield having rear and front openings for minimizing heat therein.

17. The head lamp of claim 16 wherein a forward portion of light bulb is coated with an opaque material for preventing glare light from exiting the head lamp.

18. The head lamp of claim 16 wherein the peripheral region is further defined as a polygon that is not radially symmetrical.

19. A head lamp for a motor vehicle comprising:

a housing adapted to be affixed to a motor vehicle;

a reflector mounted to the housing for reflecting light:

a generally transparent lens mounted to the reflector for enclosing the head lamp;

a light bulb oriented within the head lamp spaced apart from the reflector for providing illumination that is reflected from the reflector and out of the head lamp, a forward portion of light bulb being coated with an opaque material for preventing glare light from exiting the head lamp; and a bulb shield having a polygonal peripheral region that is not radially symmetrical, displaced about the light bulb for preventing glare light from exiting the head lamp, the bulb shield having a rear opening and a front opening for minimizing heat within the bulb shield.

20. A head lamp for a motor vehicle comprising:

a reflector for reflecting light:

a light bulb oriented within the head lamp spaced apart from the reflector for providing illumination that is reflected from the reflector and out of the head lamp;

a bulb shield having a peripheral region displaced about the light bulb for preventing glare light from exiting the head lamp, wherein the peripheral region is a polygon that is not radially symmetrical; and a generally transparent lens mounted to the reflector, the lens having an exit region for permitting light to exit the head lamp;

wherein the bulb shield peripheral region is further defined as a polygon similar in profile to the exit region for preventing glare light from exiting the exit region.

* * * * *